United States Patent

[11] 3,620,323

| [72] | Inventors | Riichi Maeda;<br>Yoichi Mori, both of Yokohama, Japan |
|---|---|---|
| [21] | Appl. No. | 828,980 |
| [22] | Filed | May 29, 1969 |
| [45] | Patented | Nov. 16, 1971 |
| [73] | Assignee | Nissan Motor Company, Limited<br>Yokohama, Japan |
| [32] | Priority | May 31, 1968 |
| [33] | | Japan |
| [31] | | 43/37231 |

[54] ELECTROMECHANICAL POWER TRAIN SYSTEM FOR AN AUTOMOTIVE VEHICLE
1 Claim, 13 Drawing Figs.

[52] U.S. Cl. .................................................. 180/65 A,
74/686, 290/20, 290/23
[51] Int. Cl. ...................................................... B60l 11/14
[50] Field of Search ........................................... 180/65 A;
290/9, 16, 19, 20, 21, 22, 23, 10, 11, 12, 13, 14, 15, 16; 74/686

[56] References Cited
UNITED STATES PATENTS

| 1,065,982 | 7/1913 | Stewart | 290/20 |
| 1,410,276 | 3/1922 | Stephenson | 290/16 |
| 1,762,004 | 6/1930 | Wellman | 290/29 |
| 2,581,152 | 1/1952 | Spatta | 290/14 |

*Primary Examiner*—Leo Friaglia
*Assistant Examiner*—Milton L. Smith
*Attorney*—John Lezdey ABSTRACT: An electromechanical power train system for an automotive vehicle having a driving engine with a torque converter in which an electric-generating and motor means having operation as a generator and/or motor for generating electric energy for storage supply when driven by the engine and for driving a driven shaft when energized by the storage supply, is accommodated therewith together with an electronic controller for controlling the operation of the components with speed reduction gear. The driving engine may be small enough to operate always at full power with the throttle fully open.

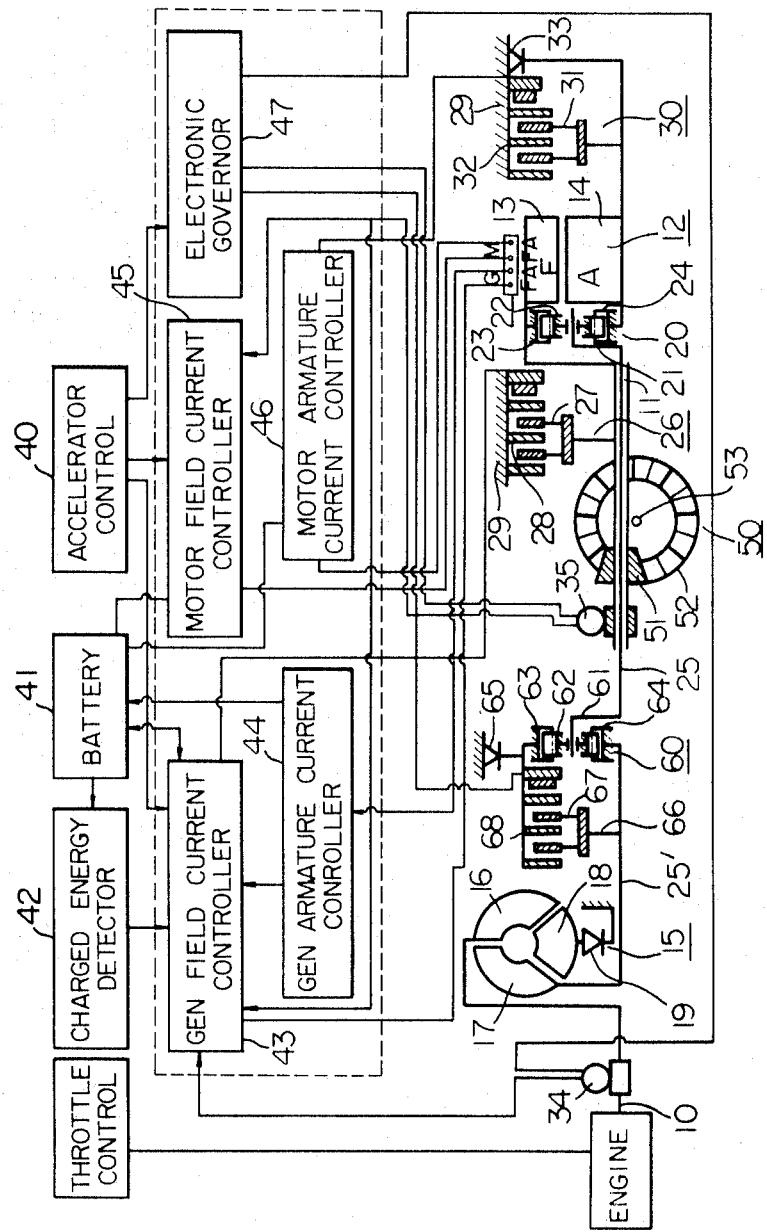

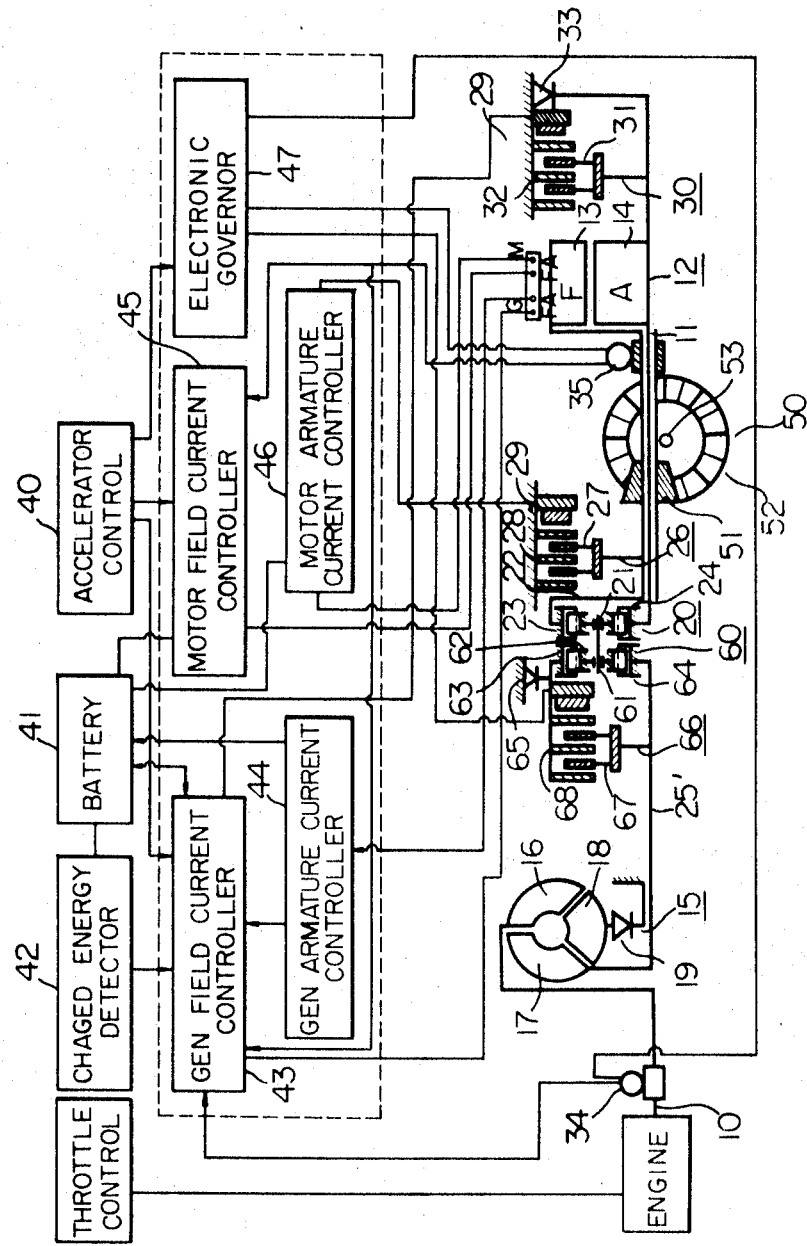

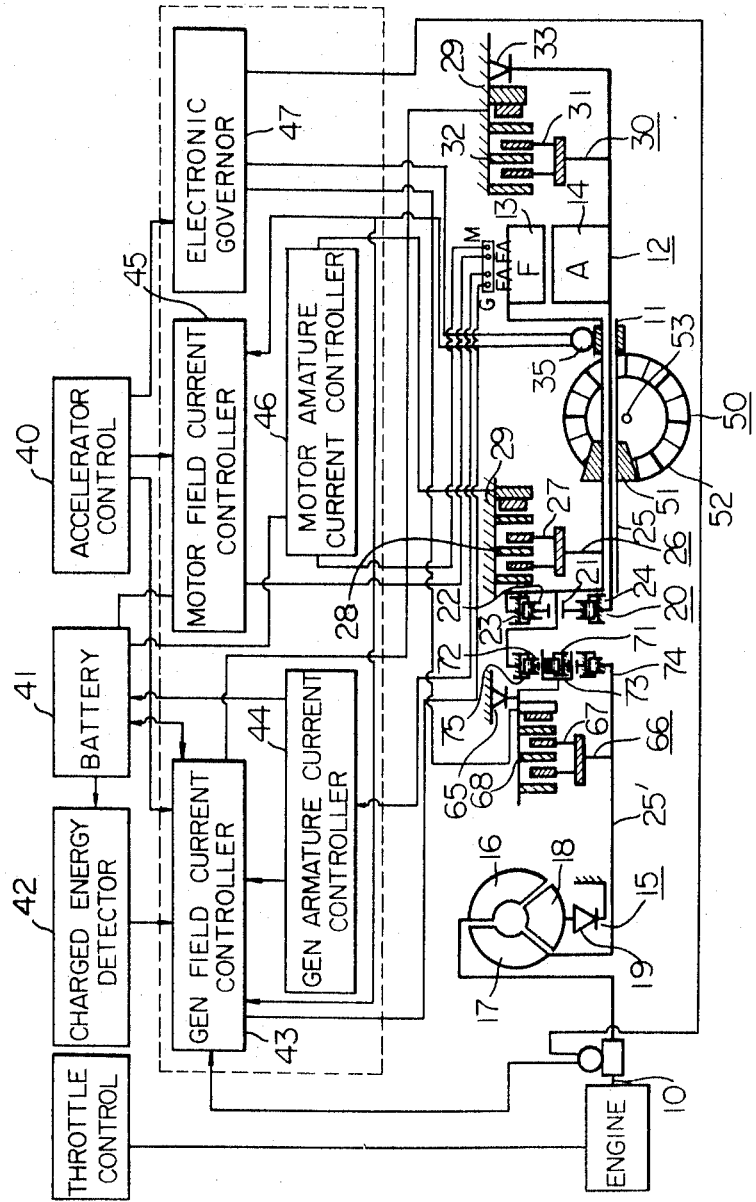

ELECTROMECHANICAL POWER TRAIN SYSTEM FOR AN AUTOMOTIVE VEHICLE

This invention relates to an electromechanical power train system for an automotive vehicle having a drive engine, and more particularly to an electromechanical power train system accommodated with a torque converter and motor generator for generating electric energy and also for driving the vehicle when energized from the electric storage supply.

The principle of the driving system of an electric car is generally divided into two, one for using battery only and the other for utilizing both the driving engine and generator with a storage battery which is termed as a hybrid electromobile. In the hybrid system there exists two ways to drive the vehicle, one for mechanical linkage of the power from the engine through the generator and motor to the propeller shaft and the other for mechanical and electrical linkage briefly by splitting the mechanical power from the engine into two parts, one for the driven shaft through the field structure of the generator and also through the armature or rotor thereof by means of a planetary gear set, the power of the engine is transmitted partly through the planet gear and ring gear meshed therewith and connected with the field of the generator and partly through the planet gear and sun gear meshed therewith and connected with the armature or rotor of the generator.

The power transmitted through the mechanical linkage, such as from the engine through the planetary gear set and generator element to the driven shaft, causes the loss thereof to be very small due to direct linkage. The power generator at the generator driven by the engine to be transmitted electrically as an electric energy to the electric motor in which both the generator and motor have some efficiency lost in operation causes some loss to a car, for example, generally at 80 percent with the result that the total is equal to the product of both efficiencies, that is, 64 percent.

If the capacity of the engine provided is to be smaller so that at normal running the engine is operating at full throttle opening, the result is that the pollution of the air by the exhausted gas from the engine due to acceleration or deceleration of the vehicle is eliminated.

In addition, since the armature of the generator is driven by the engine relative to the field thereof the electromotive force or voltage is induced at the field with the result that the torque is induced thereat, which torque is added to the mechanical power mechanically transmitted through the planet and ring gears of the planetary gear set from the engine and field of the generator directly to the driven shaft.

Thus, in addition to the total power to the driven shaft, the motor torque produced at the electric motor is also transmitted to the driven shaft with the result that the engine may be smaller than the prior hybrid system in which mechanical transmission of the torque is not added to the motor torque. It follows that the electric or motor torque is used in addition to the engine torque against the travelling resistance so as to drive the vehicle only when starting, ascending and full speed. It means that when the vehicle runs on the level road it is not necessary to utilize the electric power so that the battery for energizing the motor during operation may be smaller.

More particularly to the aforementioned torque induction at the generator, engine power transmitted through the drive shaft to the carrier of the planetary gear set is divided or split through the planet gears carrying on the carrier partly through the ring gear meshed with the planet gears and connected with the field of the generator and partly through the sun gear meshed with the planet gears and connected with the armature of the generator so that the power through the sun gear rotates the armature of the generator to cause the generation of an electric energy and the power through the ring gear and field of the generator is mechanically transmitted directly to the driven shaft, such as a propeller shaft to drive through the wheels of the vehicle. On the other hand, the voltage is induced due to the revolution of the armature at the field to cause the field to produce motor torque which is added to the mechanical torque transmitted from the engine through the carrier, planet and ring gear and field structure to the driven shaft. In addition, the electric energy generated at the generator is applied to the electric motor for driving the driven shaft, such as a propeller shaft, particularly for starting, ascending or full-speed running.

When the vehicle is stopped the sun gear rotates faster than the drive shaft with the result that high electric energy may be generated by the high-speed revolution of the armature connected with the sun gear of the planet gear set so as to make the size of the generator smaller.

Further, it will be possible to make the revolutions of the motor at high speed by incorporating a speed reduction gear between the motor shaft and the driven shaft to permit the size of the motor to be small. It is also understood that with two-speed reduction gear therebetween for low speed of the vehicle the motor may be rotated in high speed enabling the output of the vehicle to be high power particularly for starting, ascending or any other overload. On the other hand for light load, such as running on the highway the driven shaft or output shaft of the vehicle may be overdriven by incorporating with the particular type of friction engaging mechanism in the present system.

Utilizing the aforementioned principle for an electromobile the present invention contemplates to provide an electromechanical drive system for an automotive vehicle having a torque converter with only a device for operating as both a generator and motor, such as a motor generator which operates as a generator when the vehicle is stopping or idling or running in low speed so as to charge the storage power supply, such as battery, and which operates as a motor when the vehicle is accelerating, ascending or running in full speed so as to add the motor torque produced in addition to the mechanical torque transmitted from the engine through the torque converter to the driven shaft thereto.

It is an object of this invention to accomplish the aforementioned performance so as to overcome the unsolved problem for developing the actual electromobile over the conventional incomplete electric car. It is a further object of this invention to provide a novel and improved electromechanical power train system for an automotive vehicle having a torque converter such as in automatic transmission with overdrive device and speed reduction gear so as to automatically operate the movement of the electric car.

The features and advantages of the present invention will become apparent from the following description taken in conjunction with the accompanying drawings, in which:

FIG. 4 is a schematic view of a further embodiment of this system according to the present invention having two speed reduction gears;

FIG. 5 is a schematic view of a still further embodiment of this system incorporated with two planetary gear sets disposed between the torque converter and hypoid gears;

FIG. 7 is a schematic view of modification of this system according to the present invention having a double-planet planetary gear set instead of planetary gear set;

Figure 1:
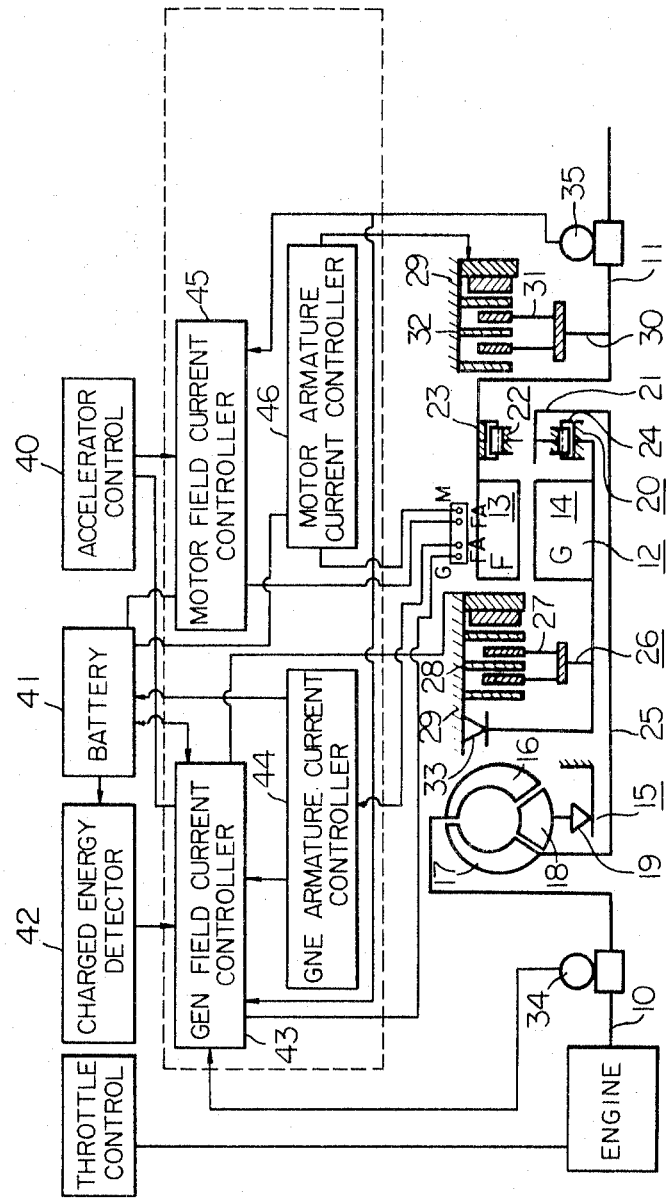
FIG. 1 is a schematic diagram of an electromechanical power train system according to one embodiment of the present invention.

Referring now to FIG. 1, which shows a schematic diagram of an electromechanical power train system in accordance with one embodiment of the present invention, which is consisting largely of a drive shaft 10 driven by the automotive engine; a driven shaft 11 such as a propeller shaft for driving wheels; an electric generating motor means or motor generator 12 which is driven through the intermediate shaft 25 by the engine or is energized by an electric power and including a field element 13 and armature 14; a hydrodynamic coupling means or hydraulic torque converter 15 including a vaned impeller element or pump 16 driven through the drive shaft 10, a vaned rotor or driven element or turbine 17 hydraulically driven by the pump 16, a vaned stater or reaction element 18 with one-way brake to be connected when energized; a planetary gear set 20 engaged between the drive shaft 10 through the torque converter 15 and the generator 12 and including a carrier 21 connected with an intermediate shaft or turbine shaft 25 connected with the turbine 17, a plurality of planet gears 22 carried on the carrier 21, a ring gear meshed with the planet gears 22 and connected with the field 13 of the generating motor means 12 and with the driven shaft 11 and a sun gear 24 engaged in mesh with the planet gears 22 and connected with the armature 14 of the generator 12; a first friction-engaging device or a first brake 26 including a rotary portion 27 connected with the armature 14 of the motor means 12 and a stationary portion 28 connected with a body 29 of the vehicle; a second clutch 30 including a driving portion 31 connected with the driven shaft 11 and a driven portion 32 connected with the body 29 of the vehicle for parking; one-way brake 33 connected at one side with the body 29 of the vehicle and at the other side with the armature 14 of the generator 12 in parallel with the brake 26; a first governor or tachometric generator 34 engaged with the drive shaft 10; a second governor or tachometric generator 35 engaged with the driven shaft 11. The electronic control equipment comprises an accelerator control 40 cooperatively connected with a variable resistance (not shown), a battery 41, a charged energy detector 42 for detecting the amount charged in the battery 41 for providing an electric signal in response to the charged amount; a generator controller including a field controller 43 for connecting the battery 41 with the field coil thereof and under the control of the charged energy detector 42 for the battery 41, an armature controller 44 for controlling armature current flow from the armature 14 to the battery 41 and vice versa; a motor controller including a field controller 45 for controlling armature current flow of the motor 12 and an armature controller 46 for controlling armature current flow of the motor 12 and under the control of the accelerator control 40.

In the hydraulic torque converter 15, the vaned elements 16, 17 and 18 are disposed within a fluid tight casing (not shown), a part of which is formed by the casing (not shown) of the impeller 16. The impeller 16 is driven by the drive shaft 10. The rotor 17 is rotatably engaged with the housing. The stator 18 is rotatably disposed with respect to the casing (not shown). The one-way brake 19 is disposed between the stator 18 and the body of the casing. The one-way brake may be of any suitable construction and is so arranged as to allow a free rotation of the stator 18 in the forward direction that is in the same direction as the drive shaft 10 rotates and to prevents a rotation of the stator 18 in the opposite direction of the input shaft.

The torque converter 15 functions in a manner well known that it drives the turbine or driven element 17 at an increased torque with respect to the torque impressed on the impeller 16 of the converter by the engine. The vane of the stator 18 functions to change the direction of flow of fluid between the rotor 17 and impeller 16 of the converter 15 so as to provide the increased torque on the driven element 17, in which case the reaction on the stator 19 is in the direction reverse to the rotation of the drive shaft 10, so that the one-way brake 19 engages and prevents the rotation of the stator 18 in this direction. When the speed of the driven element or rotor 17 reaches a predetermined value, the reaction on the vanes of the stator 19 varies in the direction, which tends to rotate the stator 18 in the forward direction, and the brake 19 releases and allows such rotation of the stator 18, in which case the torque converter 15 functions as a simple fluid coupling so as to drive the rotor 17 at substantially the same speed and with no increases in torque with respect to the impeller 16. Here, the ratio of the output torque of the turbine with the engine torque depends upon the ratio of the rotating speed of the pump with that of the turbine. If the turbine speed reaches the same engine speed, the torque ratio therebetween becomes one. Thus, such increased torque is transmitted through the planetary gear set to the generating motor means 12.

In operation of the aforementioned arrangement of this system will be hereinafter described.

The power Pi transmitted from the driving engine through the drive shaft 10 and torque converter engaged therewith is transferred to the carrier 21 of the planetary gear set 20 so that it is split or divided one through the ring gear 23 of the planetary gear set 20 to the field 13 of the generating motor means 12 and the other through the sun gear 24 of the planetary gear set 20 to the armature 14 of the generating means 12.

When the vehicle is stopping, the brake 30 is engaged so that the driven shaft 11 is secured to the body 29 of the vehicle, and the ring gear 23 connected with the driven shaft 11 is also fixedly secured to the body 29. When the brake 26 is released, the armature 14 of the generating means 12 is driven through the planetary gear set 20 and torque converter by the driving engine so that the generating motor means 12 generates an electric energy which functions as a generator.

Then, when the vehicle starts, the brake 30 is released while the brake 26 is engaged so that the field 13 of the generating means 12 is free to rotate while the armature 14 thereof is engaged with the body 29 and an electric energy is supplied thereto from the battery 41 so that the generating motor means 12 operates to drive the rotary field 13 to produce a motor torque as a motor operation so as to drive the driven shaft 11. In this state, the armature 14 of the motor means 12 continues to rotate due to the rotary inertia at the stopping state, but as time goes, it reduces its speed to stop. Then it tends to continue to rotate in reverse direction, but since there is provided the one-way brake 33 which allows the armature 14 of the motor means 12 to rotate in the same direction of rotation of the input shaft, it is prevented from rotating in the reverse direction with the result that the armature 14 is stopped so that the reaction of the rotating force of the armature 14 effects the rotary field to rotate in the forward direction thereby driving the vehicle in the forward direction. Assuming that the vehicle is still kept stopping in this state, the sun and ring gears 24 and 23 of the planetary gear set 20 is also stopped so that the carrier 21 thereof is also stationary with the result that the turbine 17 of the torque converter 15 is also stopped to fall in a stall state so that it produces a great torque which is transmitted through the planetary gear set 20 to the driven shaft 11 together with the motor torque added thereto.

Figure 2:
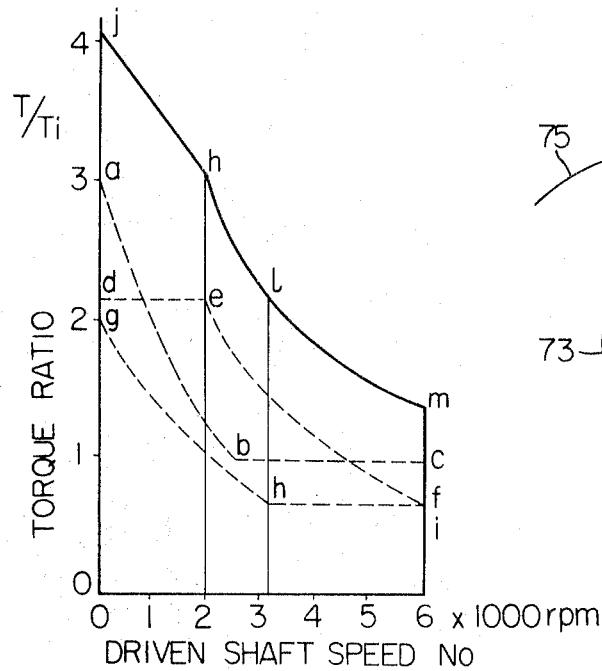
FIG. 2 is a graph of the relationship between the revolution of the driven shaft and the torque ratios of the torque converter, motor and other components.

Referring now to FIG. 2, which shows a graph of the relationship between the revolution of the driven shaft and the torque ratios of the torque converter, motor or other transmission; the curve designated by a–b–c shows the torque characteristics of the torque converter, the curve by d–e–f that of the motor. The motor torque is transferred directly to the driven shaft 11 while the torque of the torque converter is reduced due to the speed increase to that as shown by the curve g–h–i because the sun gear 24 is stopped and the ring gear is overdriven, whereupon the coupling point b moves to the point designated by h due to the speed increase. It follows that the sum of these torque is applied to the driven shaft 11 as illustrated by the curve j–k–l–m for the motor operation of the generating motor means.

If the motor operation of the motor means 12 stops, the torque applied to the driven shaft 11 will become that as shown by the curve g–h–i, and further if the generating means 12 is operated as a generator the torque is still reduced. Thus, the torque at the driven shaft 11 is controlled in response to the travelling resistance on the road. It means that in such an operation the driving engine may be operated at the throttle always fully opened so that the detrimental pollution of the air is avoided due to the exhausted gas containing carbon monoxide. Whereupon, the brake 26 should be engaged so that the rotating difference between the intermediate or turbine shaft 25 and the driven shaft 11 is kept at the generating motor means 12.

Turning back to FIG. 1, in operation of the electronic controller of the system, the field controller 43 of the generating means 12 operates to control the electric current flow through the field coil thereof so as to always maintain the rotating difference between the field 13 and armature 14 of the generating means 12 constant in order to generate a predetermined potential of its voltage generated to flow constant current to the storage supply 41 upon receipt of the voltages generated at the tachometric generator 34 and 35 connected with the drive and driven shafts 10 and 11. The accelerator control 40 is driven by an operator so as to control the drive of the driven shaft 11, such as propeller shaft, in view of the indication from the tachometric generator 35 cooperatively engaged with the driven shaft 11 to cause the torque of the latter to be in response to the requirement. If the operator presses the accelerator or foot pedal, it provides more current to flow through the field 13 of the motor means 12 so that it accelerates to drive the driven shaft 11 to increase the drive torque produced at the motor 12. On the other hand, when he releases the accelerator, it provides less current to flow therethrough so that it decelerates the vehicle speed or similarly to the action of the engine braking the motor 12 is driven by the driven shaft 11 so as to generate current flow to brake the vehicle to effect the braking action.

Figure 3:
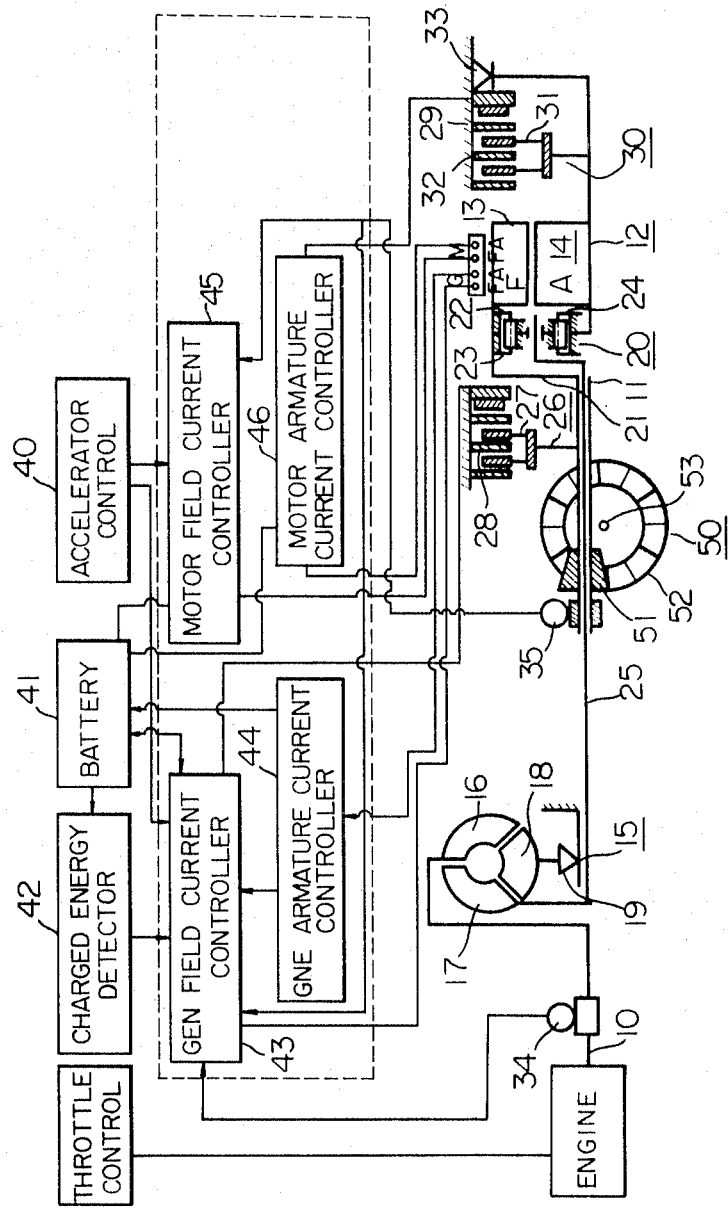
FIG. 3 is a schematic diagrammatic view of another embodiment of the present invention showing the electromechanical power train system accommodated with hypoid gears between the torque converter and the planetary gear set.

Referring now to FIG. 3, which shows another embodiment of the system according to the present invention having hypoid gears between the torque converter and the planetary gear set, which system comprises in addition to the first embodiment hypoid gears 50 including a hypoid pinion gear 51 connected with the driven shaft 11 which is hollow and through which the intermediate shaft 25 is passed and at one side connected with the turbine 17 of the torque converter 15 and at the other side connected with the carrier 21 of the planetary gear set 20, a crown gear 52 meshed with the hypoid pinion gear 51 and carried on the rear wheel axle 53. In the arrangement of this system the brake 30 and one-way brake 33 is disposed at the rear side of the generating and motor means 12 in connection similar to that shown in FIG. 1. The planetary gear set 20 is disposed adjacent and front side of the motor means 12 together with the brake 30 for the parking. The speed of the driven shaft 11 is reduced through the hypoid gears to the rear axle so as to increase the torque transmitted thereto.

Referring now to FIG. 4, which shows a further embodiment of this system according to the present invention having two speed reduction gears, which is consisting in addition to that shown in FIG. 3 largely of a second planetary gear set 60 including a second carrier 61 connected through the intermediate shaft 25 to the first carrier 21 of the first planetary gear set 20, a plurality of planet gears 62 carried on the carrier 61, a ring gear 63 engaged in mesh with the planet gears 62, and a sun gear 64 meshed with the planet gears 62 and connected with the turbine 17 of the torque converter 15; a second one-way brake 65 connected at one side with the ring gear 63 of the planet gear 60 and at the other side with the body 29 of the vehicle; a clutch 66 including a first rotary portion 67 connected with the turbine 17 of the torque converter 15 and with the sun gear 64 of the planetary gear set 62 and a second rotary portion 68 connected with the ring gear 63 of the planetary gear set 62 and one side of the second one-way brake 65 in parallel with the planetary gear set 60, said second one-way clutch 65 allowing the second ring gear 63 of the second planetary gear set 60 to rotate it in the forward direction of the vehicle but to preventing it from rotating in reverse direction.

In operation of the embodiment of this system, when the vehicle runs in low speed, the third clutch 66 is released with the result that the power from the engine is transmitted through the torque converter 15, the turbine shaft 25' engaged therewith to the sun gear 64 of the second planetary gear set 62, Whereupon if the intermediate shaft 25 connected with the carrier 61 of the planetary gear set 62 is stopped or is rotating in low speed the reverse torque is applied to the ring gear 63 of the planetary gear set 60. This action is restricted to act under the action of the second one-way brake 65 so that the rotation of the carrier 61 is reduced. In this case, assuming that the gear ratio between the sun and ring gears 64 and 63 of the planetary gear set 62 is denoted by $r$, its gear reduction ratio becomes that shown by $(r+1)$. The torque generated at the second carrier 61 of the planetary gear set 60 transmitted through the torque converter 34 from the engine is transferred through the intermediate shaft 25 to the first carrier 21 of the first planetary gear set 20, then transmitted through the first planet gears 22 carried on the first carrier 21, the first ring gear 23 meshed with the first planet gears 22 and connected with the driven shaft 11 to the driven shaft 11.

In high-speed operation, the clutch 66 is engaged by the energization of an electric governor 47 which produces high-speed signal by comparing the signals from the tachometric generator 35 engaged with the driven shaft and from the variable resistance cooperatively connected with the accelerator control 40 so as to generate speed signal, whereupon the second one-way brake is released thereby with the result that the speed of the second ring gear 63 and second carrier 61 becomes the same as that of the turbine shaft 25'.

In the aforementioned operation of this embodiment, the torque of high speed in this system is shown in FIG. 2, while in low speed the speed ratio at the torque converter 15 is $1/(r+1)$ while the torque ratio is $(r+1)$ times so that the sum of the torque increased at the torque converter 15 and motor torque transmitted to the driven shaft 11 is high.

Referring now to FIG. 5, which shown still another embodiment of the system according to this invention having two planetary gear sets disposed between the torque converter and hypoid gears, the first planetary gear set 20 is disposed immediately after the second planetary gear set 60 together with the brake 30 and immediately after the first planetary gear set 20 so that the hypoid gears 50 are located between the two planetary gear sets with the brake 30, and the generating motor means 12 in comparison with the embodiment shown in FIG. 4. The connection and engagement between these components are entirely the same as those shown in FIG. 4. And the operation of this system is also the same as the previous embodiment.

Figure 6:
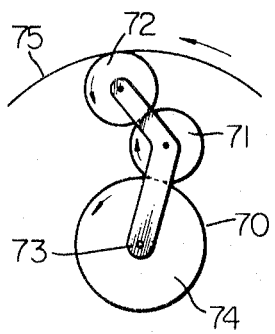
FIG. 6 is a schematic side view of a double-planet planetary gear set to be applied to this system.

Referring now to FIG. 6, which shows a schematic side view of a double-planet planetary gear set to be applied to the embodiment of this system, designated at 70 is a double-planet planetary gear set which comprises two pairs of planet gears 71 and 72 meshed with each other carried on a carrier 73, one of which is engaged in mesh with a sun gear 74 and the other of which is meshed with a ring gear 75. The carrier 73 is bearing two planet gears integrally together with being supported on the carrier.

Referring now to FIG. 7, which shows a schematic view of modification of this system according to this invention having a double-planet planetary gear set instead of planetary gear set, which comprises, instead of the second planetary gear set in the system shown in FIG. 5, a double-planet planetary gear set 70 including two pairs of planet gears 71 and 72 meshed with each other carried on a carrier 73 connected with the driven portion 68 of the clutch 66 and with the one side of the one-way brake 65, one planet gear 71 being meshed with the sun gear 74 connected with the driven portion 67 of the third clutch and with the turbine 17 of the torque converter 15, the other planet gear 72 being engaged in mesh with the ring gear 75 connected with the first carrier 21 of the first planetary gear set 20, the other connection and engagement of the arrangement being the same as that shown in FIG. 5.

In operation of the aforementioned system, when the vehicle runs in low speed, the carrier 73 has a resistance through the ring gear 75 with the result that it receives a reaction due to its resistance tending to rotate in reverse direction but its reverse rotation is prevented by the second one-way brake 65. It is assumed that the ratio between the ring and sun gears is denoted by $r$, the speed reduction ratio thereof is expressed by $r+l$ which is rather higher reduction. The other operation and function of this system are the same as those shown in FIG. 4.

Figure 8:
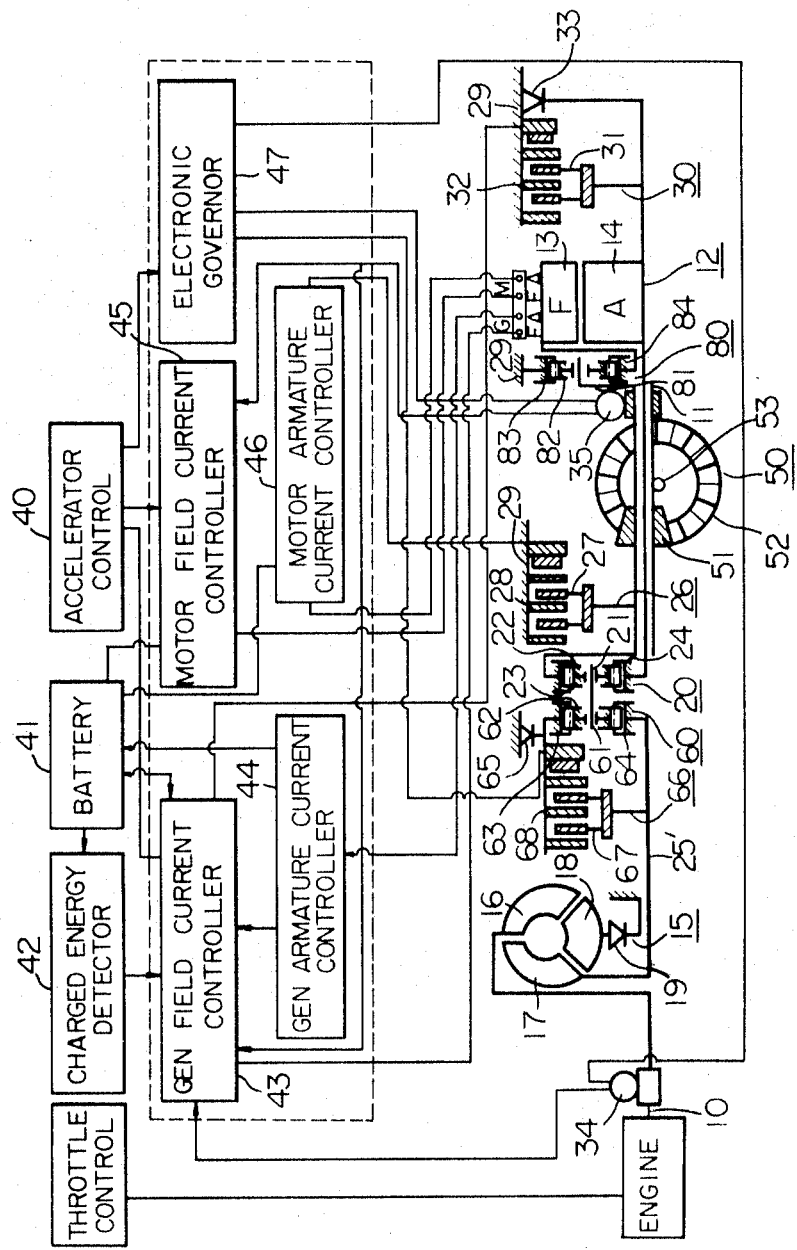
FIG. 8 is a schematic view of another modification of this system according to this invention having a third planetary gear set between the generating motor means and driven shaft.

Referring now to FIG. 8, which shows a schematic view of another modification of this system according to this invention having a third planetary gear set between the generating motor means and driven shaft, which comprises in addition to that shown in FIG. 5 a third planetary gear set including a third carrier 81 connected with the driven shaft 11, a third planet gear 82 carried on the carrier 81, a third ring gear 83 engaged in mesh with the planet gear 82 and connected with the body 29 of the vehicle, a third sun gear 84 meshed with the planet gear 82 and connected with the field 13 of the generating motor means 12.

From the foregoing arrangement of this system, it is understood that the generating motor means 12 rotates in higher speed than the previous embodiments due to higher speed reduction by the third planetary gear set 80 in use as a motor with the result that the size of the motor means 12 may be lessened. When the generating means 12 is used as a generator, such as when the vehicle stops, the ring gear 23 of the first planetary gear set 20 is fixedly secured through the brake 26 so that the torque transmitted through the torque converter 15 from the engine drive to rotate the carrier 61 causes the sun gear 24 to accelerate its rotation.

More particularly to the operation of this system, when the generating motor, means 12 is used as a motor the field 13 thereof is engaged with the third sun gear 84 of the third planetary gear set 80, the ring gear 83 fixedly secured with the body of the vehicle, the third carrier 81 engaged with the driven shaft 11 whereby the field 13 of the motor means 12 is rotated in higher speed than the driven shaft 11 so that it may be lessened even in the same power in comparison with the previous embodiments in which the field 13 of the generating motor means rotates the same speed as the driven shaft 11 and the motor means cannot be used in high speed when used as a motor.

Figure 9:
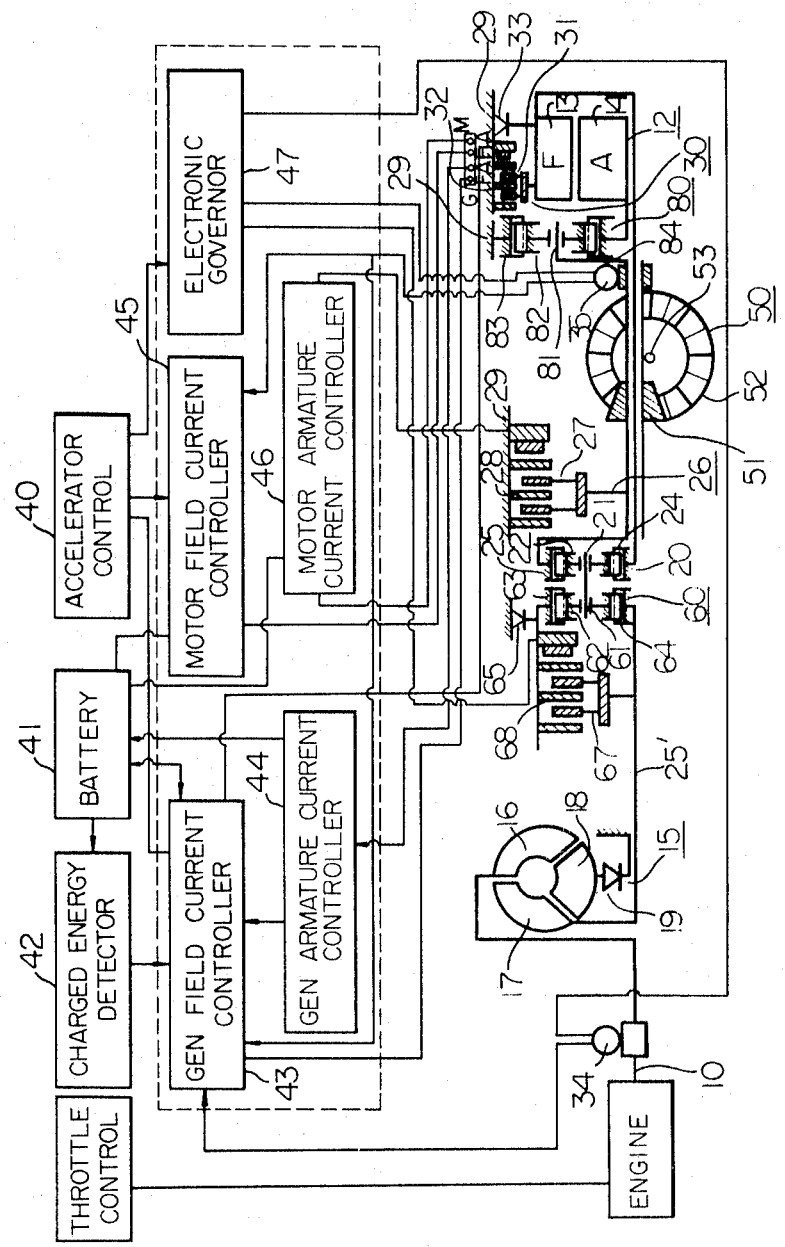
FIG. 9 is a schematic view of an alternate of the system embodying this invention in which arrangement of the armature and field is replaced in comparison to that shown in FIG. 8.

Referring now to FIG. 9, there is shown an alternate of the system embodying this invention in which arrangement the disposition of the armature and field is replaced in comparison to that shown in FIG. 8, in which the field 13 of the generating motor means is connected with the first sun gear 24 of the first planetary gear set 20 and with the brake 26 and one-way brake 33, and the armature 14 of the motor means 12 is connected with the third sun gear 84 of the third planetary gear set 80.

In general of an electric motor, the outer diameter of the field is larger than that of the armature so that the inertia of the former is also larger than the latter. It follows that when the aforementioned generating motor means is used as a motor, it cannot be well accelerated if the power is transmitted through the field 13 of the motor means 12. In the system shown in FIG. 9, the armature 14 of the motor means 12 is connected with the third sun gear 84 of the third planetary gear set 80 through which the power from the engine is transmitted with the result that it improves to accelerate the driven shaft 11 therethrough. Thus, the motor means may have a light load in high speed. Further, since the torque from the engine may be automatically converted at the torque converter in response to the load, a complicated control of the motor means 12 by means of the electronic control equipment may be eliminated except for being used as a generator so that upon stoppage of the vehicle, the brake 26 is engaged to connect the driven shaft 11 with the body 29 of the vehicle. In high-speed operation, the clutch 66 is engaged, and in low and reverse operation the brake 30 is engaged as previously described, which are all simple, with the result that this system is pertinent for using with an automobile.

Figure 10:
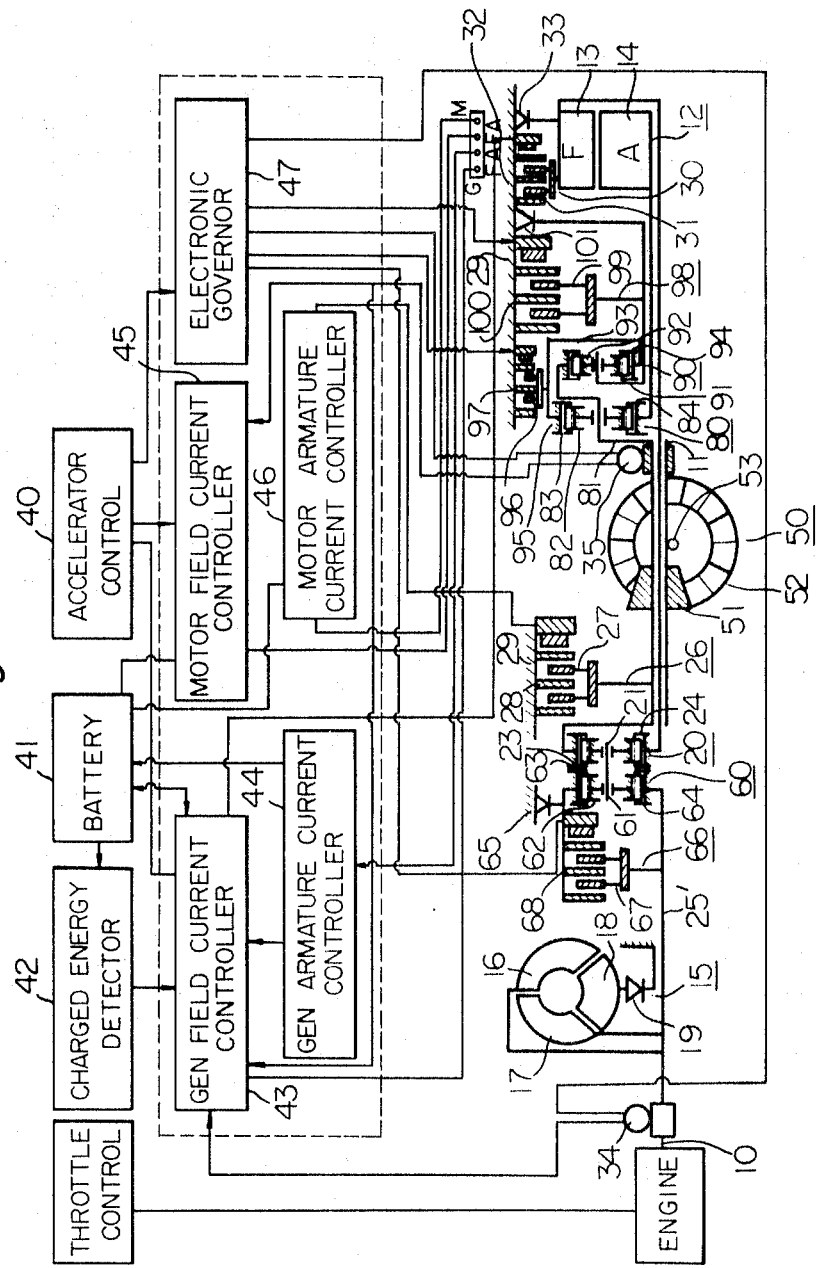
FIG. 10 is a schematic view of another alternate of the system having two planetary gear sets for two-speed gear reduction.

Referring now to FIG. 10, which shows another alternate of the system in accordance with this invention having two planetary gear sets for two-speed gear reduction, which comprises in addition to those shown in FIG. 9 a fourth planetary gear set 90 including a fourth carrier 91 connected with the rotary portion 99 of the fifth friction-engaging device 98 and one-way brake 101, a plurality of fourth planet gears 92 carried on the fourth carrier 91, a fourth ring gear 93 engaged in mesh with the fourth planet gears 92 and connected with the third carrier 81 of the third planetary gear set 80, and a fourth sun gear 94 meshed with the fourth planet gear 92; a friction-engaging device or brake 95 including a driving portion 96 connected with the third ring gear 83 and with the fourth sun gear 94, and a driven portion 97 connected with the body 29 of the vehicle; a friction-engaging device or brake 98 including a driving portion 99 connected with the fourth carrier 91, and a driven portion 100 connected with the body 29 of the vehicle.

In the operation of this embodiment of the invention, when the vehicle runs in low speed the brake 98 is engaged so that the speed reduction increases, while upon high speed of the vehicle the brake 95 is engaged similar to the arrangement shown in FIG. 9. Thus, in low-speed operation, the speed reduction is extremely increased, which is pertinent for large type of vehicle, such as having a larger load vehicle weight in comparison with the engine and generating motor such as, for example, a bus or truck.

Figure 11A:
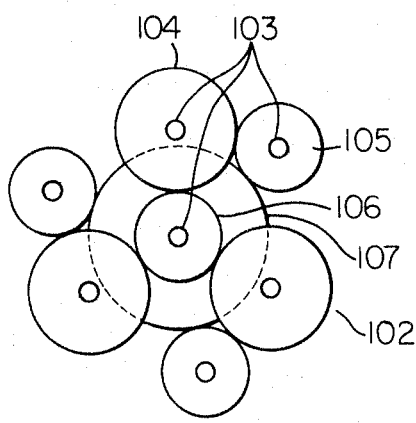
FIGS. 11A and 11B are schematic sectional and front views of an alternate of planetary gear set without ring gear, respectively.
Figure 11B:
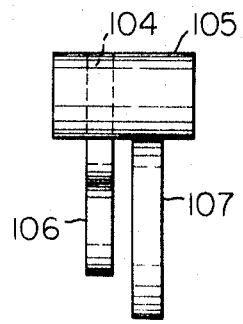

Referring now to FIGS. 11A and 11B, which show schematic sectional and front views of an alternate of planetary gear set designated by 102 without ring gear, respectively, which comprises carriers 103, first and second planet gears 104, 105, and first and second sun gears 106, 107.

This planetary gear set 102 operates similar to that of a normal planetary gear set. In this set, the first sun gear 106 engages with the first planet gears 104, extended second planet gears 105 meshed with the first planet gears 104 and also engaged in mesh with the second sun gear 107.

It is understood that this planetary gear set without ring gear is easy to work machining and may provide larger speed reduction ratio.

Figure 12:
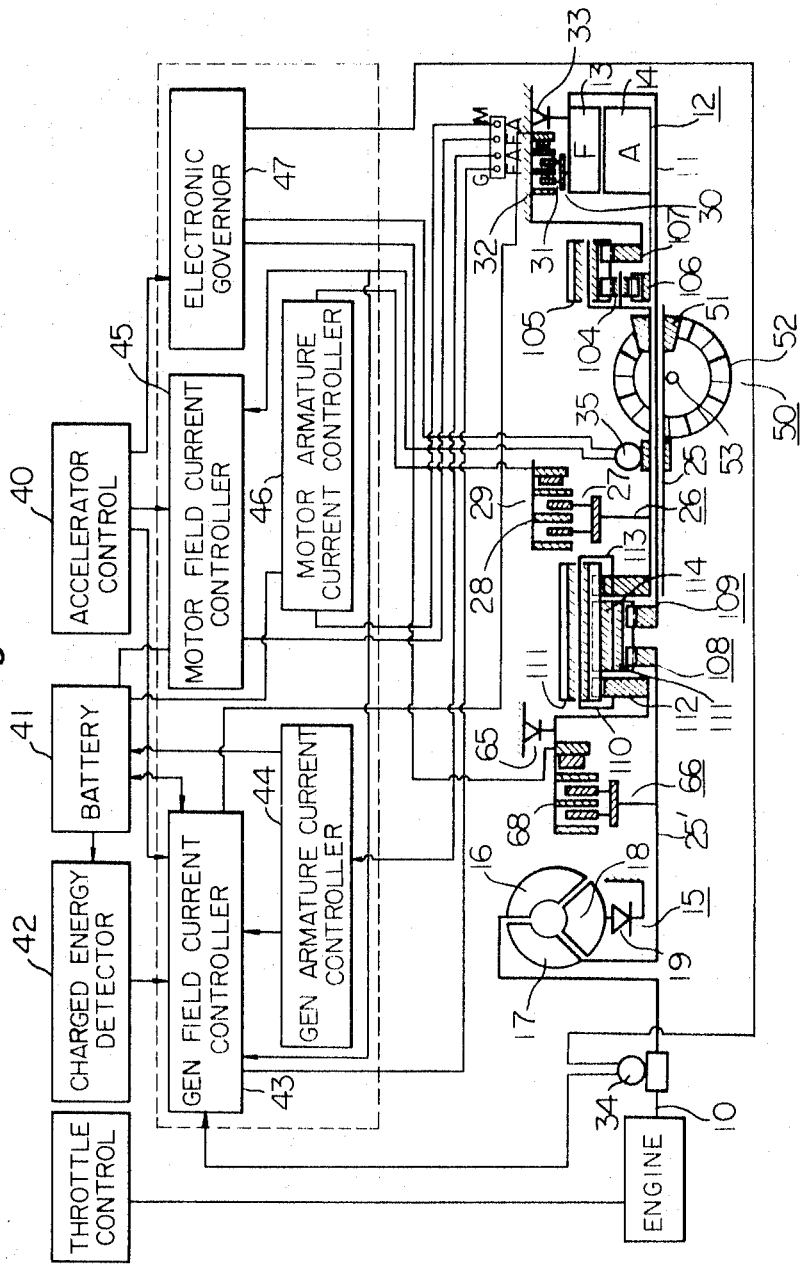
FIG. 12 is a schematic view of still another alternate of the system incorporated with the planetary gear set without ring gear.

Referring now to FIG. 12, which shows still further modification of the system incorporated with the planetary gear set having no ring gear, according to the present invention, which comprises instead of first, second and third planetary gear sets shown in FIG. 11, first and second planetary gear sets 108 and 109 having no ring gear; said first one including a first carrier 110, first planet gear 111 carried on the first carrier 110, first sun gear 112 meshed with the first planet gear 111 and connected with the second one-way brake 65 and the driven portion 68 of the third clutch 66; said second one including a second carrier 113 connected with the hollow driven shaft, second planet gears 114 carried on the third carrier 113, and a second sun gear 115 meshed with the second planet gears 114 and connected with the armature 14 of the generating motor means 12.

The operation of this embodiment is entirely the same as that shown in FIG. 9.

What is claimed is:

1. An electromechanical power train system for an automotive vehicle having a driving engine comprising a drive shaft adapted to be driven by the engine via a torque converter; a driven shaft to drive the vehicle; a storage power supply; electric generator and motor means connected to said storage power supply and adapted for operating as a motor during acceleration wherein current is fed thereto from said storage power supply and as a generator during other periods wherein current is fed to said storage power supply therefrom, said means having a field structure and an armature; a planetary gear set having a sun gear, a plurality of planet gears, a carrier rotatably supporting said planet gears, and a ring gear; a first friction brake having a portion which is stationary relative to the vehicle body and a rotary portion; a second friction brake having a portion which is stationary relative to the vehicle body and a rotary portion; and a one-way brake, said carrier being connected to the drive shaft, said ring gear being in mesh with said planet gears and connected to said field structure and to said driven shaft, said sun gear being in mesh with said planet gears and connected to said armature, said rotary portion of said first friction brake being connected to said armature, said stationary portion of said first friction brake fixably mounted on the body of the vehicle, said rotary portion of said second friction brake being connected to said driven shaft, said stationary portion of said second friction brake being fixably mounted on the body of the vehicle, said one-way brake being connected on one side to the body of the vehicle and on the other to said armature for preventing said armature and said sun gear from rotating in a direction of opposite the direction of the rotation of said drive shaft.

* * * * *